(12) United States Patent
Denoue et al.

(10) Patent No.: US 7,680,820 B2
(45) Date of Patent: Mar. 16, 2010

(54) SYSTEMS AND METHODS FOR DISPLAYING TEXT RECOMMENDATIONS DURING COLLABORATIVE NOTE TAKING

(75) Inventors: Laurent Denoue, Palo Alto, CA (US); Patrick Chiu, Menlo Park, CA (US); Tohru Fuse, Santa Clara, CA (US)

(73) Assignee: Fuji Xerox Co., Ltd. (JP)

( * ) Notice: Subject to any disclaimer, the term of this patent is extended or adjusted under 35 U.S.C. 154(b) by 379 days.

(21) Appl. No.: 10/125,346

(22) Filed: Apr. 19, 2002

(65) Prior Publication Data

US 2003/0197729 A1  Oct. 23, 2003

(51) Int. Cl.
*G06F 7/00* (2006.01)
*G06F 17/00* (2006.01)
*G06F 15/16* (2006.01)

(52) U.S. Cl. .................. 707/104.1; 707/1; 709/204

(58) Field of Classification Search .............. 707/200, 707/201, 1, 3, 5, 207; 345/848, 302; 709/204, 709/203, 213, 248; 705/2, 3, 5, 7; 382/185, 382/229; 710/67
See application file for complete search history.

(56) References Cited

U.S. PATENT DOCUMENTS

| | | | | |
|---|---|---|---|---|
| 5,802,282 A | * | 9/1998 | Hales et al. | 709/204 |
| 5,852,435 A | * | 12/1998 | Vigneaux et al. | 345/428 |
| 5,890,163 A | * | 3/1999 | Todd | 707/200 |
| 5,953,541 A | * | 9/1999 | King et al. | 710/67 |
| 6,338,047 B1 | * | 1/2002 | Wallman | 705/36 R |
| 6,731,314 B1 | * | 5/2004 | Cheng et al. | 715/848 |
| 6,782,413 B1 | * | 8/2004 | Loveland | 709/204 |
| 6,832,242 B2 | * | 12/2004 | Keskar | 709/204 |
| 6,904,408 B1 | * | 6/2005 | McCarthy et al. | 705/2 |

OTHER PUBLICATIONS

Publication: "Using Collaborative Filtering to Weave an Information Tapestry", David Goldberg et al., Communications of the ACM Dec. 1992 vol. 35, No. 12, pp. 61-70.*
M. Balabanovic et al., "Content-Based, Collaborative Recommendation", *Communications of the AMC*, vol. 40, No. 3, pp. 66-72, Mar. 1997.

(Continued)

*Primary Examiner*—Apu M Mofiz
*Assistant Examiner*—Susan Y Chen
(74) *Attorney, Agent, or Firm*—Sughrue Mion, PLLC

(57) ABSTRACT

Multiple users access a collaborative data-sharing system during a data-sharing event. Each user can establish the level of sharing to be allowed with each other user and filtering criteria for filtering the data before it is provided to the other users. Data can be extracted from a number of different sources, including data input by other users and/or previously created information sources. For example, slides from a presentation on a similar topic may be identified and included by a user as a potential source of information to be used by other users. Shared data can be displayed on devices used by users to communicate with the collaborative data-sharing system. A user can selected data provided by the collaborative data-sharing system, which was obtained from the data input by other users and/or from the identified additional data sources and added to that user's data as data entered by that user.

27 Claims, 8 Drawing Sheets

OTHER PUBLICATIONS

B. Myers, "Collaboration Using Multiple PDAs Connected to a PC", http://www-2.cs.cmu.edu/~pebbles/papers/cscw2000workshop/ 2000, pp. 6.

P. Resnick et al., "GroupLens: An Open Architecture for Collaborative Filtering of Netnews", *Proceedings of ACM 1994 Conference on Computer Supported Cooperative Work*, Chapel Hill, NC, pp. 175-186, Association of Computing Machinery, 1994.

L. Terveen et al., "A System for Sharing Recommendations", *Communications of the ACM*, vol. 40, No. 3, pp. 59-62, Mar. 1997.

D. Turnbull, "Filtering and Collaborative Filtering", http://donturn.fis.utoronto.ca/research/kmdi-cf.html, 1997, pp. 11.

J. Landay, "Making Sharing Pervasive: Ubiquitous for Shared Note Taking", http://www.research.ibm.com/journal/sj/384/landay.html, 1999, pp. 17.

"NotePals: Lightweight Meeting Support Using Personal Digital Assistants and Note-taking Appliances", http://guir.berkely.edu/projects/notepals/, 2002, pp. 2.

E.F. Churchill et al., "Anchored Conversations: Chatting in the Context of a Document", In CHI 2000 Conference Proceedings, ACM Press, pp. 454-461, 2000.

J. Darragh et al., "The Reactive Keyboard: A predictive typing aid", IEEE Computer 23, 11, pp. 41-49, Nov. 1990.

R. Davis et al., "NotePals: Lightweight note sharing by the group, for the group", Proceedings of the CHI '99 Conference, ACM Press, pp. 338-345, 1999.

T. Masui, "An efficient text input method for pen-based computers", Proceedings of CHI '98, ACM Press, pp. 328-335, 1998.

D. Goldberg et al., "Touch-typing with a stylus", Proceedings of INTERCHI '93, ACM Press, pp. 80-87, 1993.

* cited by examiner

SYSTEMS AND METHODS FOR DISPLAYING TEXT RECOMMENDATIONS DURING COLLABORATIVE NOTE TAKING

BACKGROUND OF THE INVENTION

1. Field of Invention

This invention is directed to systems and methods for real-time filtering and sharing of information.

2. Description of Related Art

As low-cost, digital note-taking devices become more pervasive and ubiquitous, system and methods for taking and sharing notes have been developed. Shared note taking enables groups to better communicate ideas and information. Various collaborative note-taking systems have been devised that capture, store and share notes and ideas generated by participants using appropriate communication devices and network. Such systems provide group access to personal notes, presentation slides, and any other documents or sources of information relative to a particular meeting or session. This sharing and exchanging of ideas and information enhance the efficiency and the capability of individuals and groups.

Current note-taking systems, such as NotePals, provide lightweight meeting support systems that automatically combine individual meeting notes into a shared record. In the NotePals system, group members record notes on portable pen-based devices, such as Personal Digital Assistants. NotePals combines the individual notes into a shared document. However, NotePals only provides access to the notes and information after the conclusion of the event during which the notes were generated.

Another important element of collaborative note taking involves text entry, prediction, and recommendation. Several techniques exist to allow fast text entry of words and notes using a stylus. Some techniques provide text completion capabilities that automatically present a list of one or more words or phrases that complete an entry begun by a user for, for example, insertion into notes. These words or phrases are often extracted from a dictionary, such as the Ipaq soft keyboard completion. Another system, the Reactive Keyboard, predicts words by analyzing words previously used by a user and presents note insertion options. Other systems, such as POBox, present words predicted using different sources, including a dictionary, the frequency of use, and their correlation (e.g., "interface" comes after "user in "user interface").

Another aspect of collaborative note taking systems is the use of filtering systems that allow information to be coordinated and shared. A collaborative filtering system can leverage the information of all group members by reading and/or browsing the words, preferences, and interactions of each group member and/or other sources of information. Collaborative filtering algorithms are used by several systems, like Tapestry, GroupLens, PHOAKs, and Fab, to recommend documents and news messages based, for example, on users' preferences.

SUMMARY OF THE INVENTION

However, these systems often do not rank words, notes, and/or documents based on frequency of use or based on users' personal profiles, where other note takers are ranked higher if their words are used by a particular user.

This invention provides systems and methods for collecting, filtering and disseminating information in real-time for collaborative note taking systems.

This invention separately provides systems and methods for filtering of words from multiple sources for collaborative note taking systems in real-time.

This invention separately provides systems and methods for distinguishing and displaying text to be shared from other users and sources.

This invention separately provides identification and fast-text entry of active words and phrases into a note created using a note-taking device.

In various exemplary embodiments of the systems and methods according to this invention, multiple users may access the real-time collaborative note taking system. In various exemplary embodiments, each user can establish a personal profile that establishes the level of note sharing to be allowed. For example, users can establish how much of their notes will be shared with the other users and/or with whom the notes will be shared. In other various exemplary embodiments, the personal profiles provide filtering criteria for the display of shared notes among users.

In various exemplary embodiments of the systems and methods according to this invention, words can be extracted from a number of different sources, including notes created by other users and/or previously created information sources. For example, slides from a presentation on a similar topic may be identified and included by a user as a potential source of information to be used by other note takers, if desired.

In various exemplary embodiments of the systems and methods according to this invention, shared words and/or text can be displayed on devices used by users to communicate with the collaborative note taking system. Shared notes can be displayed using differing text variations and/or graphics to assign value or meaning to the shared note. Text and phrases generated during a collaborative note taking session can be distinguished visually to identify word categories and sources. For example, notes from the presenter of the briefing may be highlighted in bold while notes from a colleague are displayed in italics. Further, shared notes may also have a symbol or other graphical symbol next to it that identifies it as being associated with a particular user.

In various exemplary embodiments of the systems and methods according to this invention, a user of the real-time collaborative note taking systems can insert information from other users and sources through simple insertion techniques. For example, a word or phrase may be selected using a single-tap of a stylus.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the invention will be described in detail with reference to the following figures, wherein.

DETAILED DESCRIPTION OF EXEMPLARY EMBODIMENTS

Figure 1:
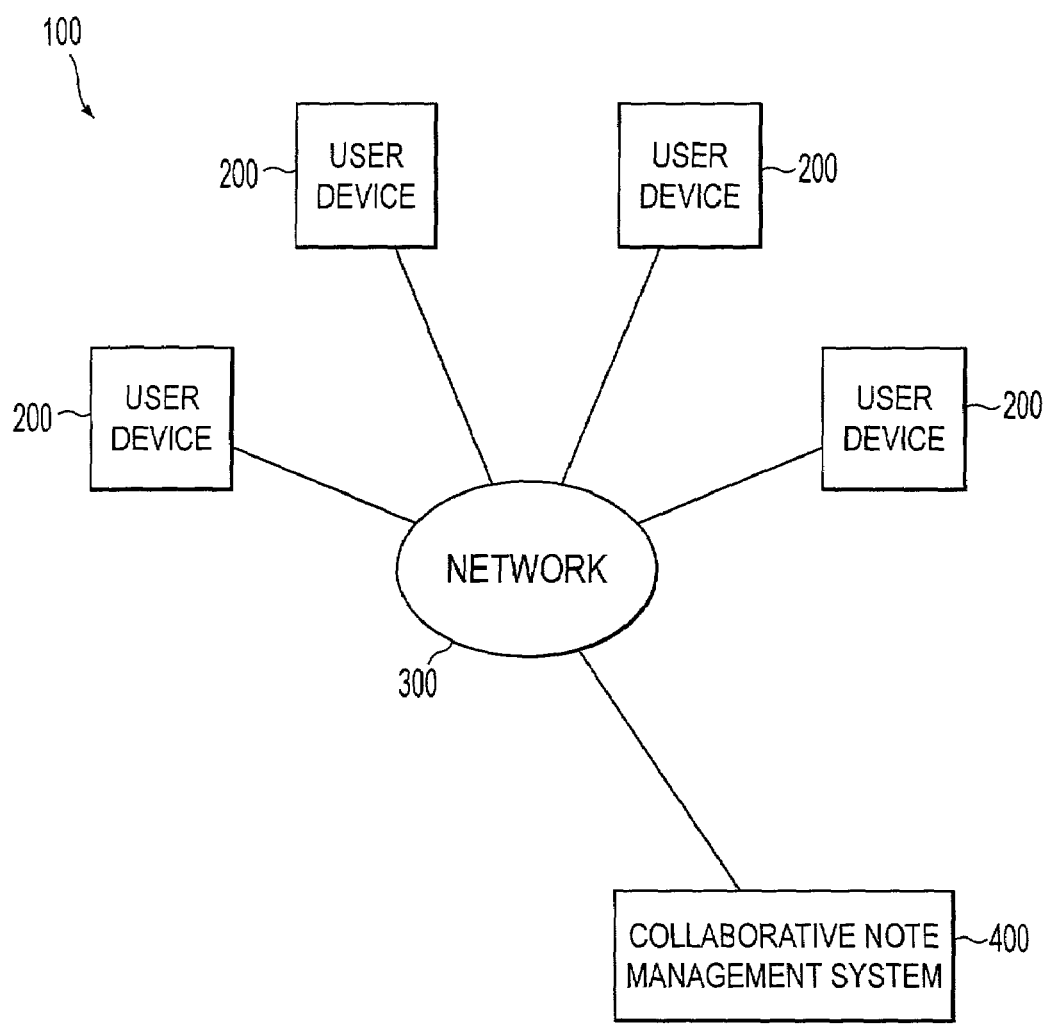
FIG. 1 is a block diagram of one exemplary embodiment of a collaborative note taking system and network usable with the systems and methods of this invention.

The systems and methods of this invention enable the state of a collaborative note taking session to be advanced by using real-time filtering and dissemination of notes and information. The mechanisms and techniques of the real time collaborative note taking may be implemented using any combination of known or later-developed hardware devices and/ or software programs designed to provide a level of compatible communication and exchange of data/information in accordance with the disclosed invention. The text sharing systems and methods according to this invention can also be used in any other known or later-developed multi-user interaction, such as during instant messaging sessions, especially when one or more of the users uses a cell phone or personal digital assistant (PDA) as that user's user device.

In various exemplary embodiments of the systems and methods of this invention, a user operating within a collaborative note taking system, or any other multi-user interaction system, can effectively exchange information with other users connected to the same collaborative note taking system or other multi-user interaction system. The users are each connected to a distributed network that is used by each user to communicate with the other participating users. In various exemplary embodiments, communication devices may be used to compile and exchange information. The type of communication devices used may be predicated on the type of distributed network being used.

In various exemplary embodiments, varying levels of filtering may be used by each user using the collaborative note taking system or other multi-user interaction system. The level and type of filtering used may vary among users and may be predicated on the type of network and/or software being used. In various exemplary embodiments, users may include personal filtering preferences that may include the level of note or text sharing, the other users with whom to share notes or text, and other outside sources of information to be included during a note taking session or other multi-user interaction session.

In various exemplary embodiments, words and/or text being shared during a note-taking session or other multi-user interaction session may be displayed and distinguished visually using various text variations and/or graphics to identify the source and/or category of words and/or text. Sources of words and/or text may include other participants in the multi-user interaction session, relevant documentation, a presenter and the like. Categories of words and/or text may include active words and/or text currently being used by other participants in the multi-user interaction session, words and/or text from earlier presentations, and the like. The types of text variations and/or graphics used may be predicated on the type of software and/or hardware being used. Further, it should be appreciated that the value and/or meaning associated with the shared words or text displayed on users' devices may vary among users depending on the individual preferences of each user.

It should be appreciated that the types of communication devices, distributed networks, and collaborative note taking or other multi-user interaction systems used to transmit, receive and display shared information may vary or differ depending on the types of systems and/or devices being used. The systems and methods of this invention do not depend on any specific collaborative note taking or other multi-user interaction system and/or any specific distributed network. Accordingly, the systems and methods are usable with any appropriate collaborative note taking or other multi-user interaction system and/or any distributed network.

For ease of understanding, the following detailed description of the exemplary embodiments of the systems and methods of this invention are directed primarily to a specific type of multi-user interaction system, that is, a collaborative note taking system. However, it should be appreciated that the systems and methods of this invention are not limited to collaborative note-taking sytems. Thus, in the following detailed description, it should be understood that description of the systems and methods according to this invention directed to the collaborative note-taking system is equally applicable to any appropriate known or later-developed multi-user interaction system.

FIG. 1 is a block diagram of one exemplary embodiment of a collaborative note taking system 100 usable to connect a user of this collaborative note taking system 100 with other users connected to this collaborative note taking system 100. As shown in FIG. 1, the collaborative note taking system 100 includes one or more user devices 200 connected to a network 300. A collaborative note management system 400 is also connected to the network 200.

However, it should be appreciated that the collaborative note taking system 100 and the collaborative note management system 400 can be used to share more than just text notes. That is, a collaborative sharing session can involve more than sharing text notes. For example, in various exemplary embodiments, image data, numerical data, graphical data, gestural data, sounds, speech and other audio data, multimedia data and any other known or later developed types of data could be shared between users during a collaborative data exchange session. Thus, it should be appreciated that the collaborative note taking system 100 and the collaborative note management system 400 are more generally a collaborative data sharing system 100 and a collaborative data management system 400

It should be appreciated that the user devices 200, the distributed network 300 and the collaborative note (or data) management system 400, as shown in FIG. 1, while depicted separately, are not necessarily separate and distinct components. Thus, the functions and/or operations of each of these elements may be carried out by one or more devices, structures, and/or systems. Further, it should be appreciated that the user devices 200 in FIG. 1 may be any devices that use a distributed network to achieve connectivity with another device.

As shown in FIG. 1, the user devices 200 can be any devices that are connectable to a data communication network. Each user device 200 may be implemented using a programmed general computer, a special purpose computer, a programmed microprocessor, a digital signal processor (DSP), and ASIC or other integrated circuit device or programmable logic device such as a PLD, PLA, FPGA or PAL, or the like. In general, any hardware and/or software system capable of implementing and processing data and information from a data network may be used to implement each of the user devices 200.

In various exemplary embodiments, the network 300 can be implemented using any one or more of public switched telephone networks, local area networks, wide area networks, storage area networks, intranets, extranets, the Internet, or any other type of distributing network, each of which can include wired and/or wireless portions.

In various exemplary embodiments, the collaborative note (or data) management system 400 includes, but is not limited to, any known or later developed software system that defines, executes, filters, and/or controls collaborative note taking processes. The software may contain the logic of collaborative note taking, interpret the information provided, and invoke the necessary resources and/or applications required at various steps of the process. This may be accomplished by storing and interpreting information and creating and managing instances of the needed processes. Further, the collaborative note (or data) management system 400 may control the interactions between users and the interaction of users with each other and the applications. Also, the collaborative note (or data) management system 400 may provide administrative and/or supervisory note taking functions that allow information to be reassigned and/or added and/or removed and/or audited for the system or during one of the note taking sessions. It should be appreciated that the type of collaborative note (or data) management system 400 that is implemented can depend upon the requirements of the collaborative session being managed and the level of requirements to be controlled.

In various exemplary embodiments, a user of the collaborative note taking (or data sharing) system 100 uses the user device 200 to take notes and to input information relative to the collaborative session. In various exemplary embodiments, at the start of the collaborative session, the user uses the user device 200 to log into a particular collaborative note taking session. The user device 200 accesses the collaborative note (or data) management system 400 via the network 300 using a compatible communication process. For example, if the collaborative note (or data) management system 400 is located on an Internet Web server, the user can access the collaborative note (or data) management system 400 via the Internet using an HTTP connection.

In various exemplary embodiments, during the log-in process, the user can set up different options, such as establishing the level of information sharing, the type of meeting to participate in, the user's location, any related material, and the like. In various exemplary embodiments, information about meeting type and/or meeting location may be used by the collaborative note taking (or data sharing) system 100 and/or the collaborative note (or data) management system 400 to extract relevant words and/or terms or phrases from one or more documents that are relevant to that meeting type and/or location. For example, if the collaborative session is a staff meeting, a set of terms, phrases, and/or words corresponding to staff meetings may be used during the session. Further, depending upon the meeting type and/or location, different personal profiles can be automatically retrieved by the collaborative note (or data) management system 400 for particular ones of the users that are logged into the collaborative note taking (or data sharing) system 100. For example, a user can have different sets of preferred words, terms, and/or phrases to be used for a particular type of meeting and/or location.

Related material relevant to the particular collaborative session to which a user has logged into can also be selected by that user as relative material to be used during the collaborative session. For example, a PowerPoint slide presentation, a Word document, and the like can be used as a source document from which one or more words, terms, and/or phrases can be extracted and added to that user's set of words, terms, and/or phrases. It should be appreciated that this setup procedure invoked by a user logging into a collaborative note taking session may vary depending upon the particular collaborative session and the intent of that collaborative session.

Figure 2:
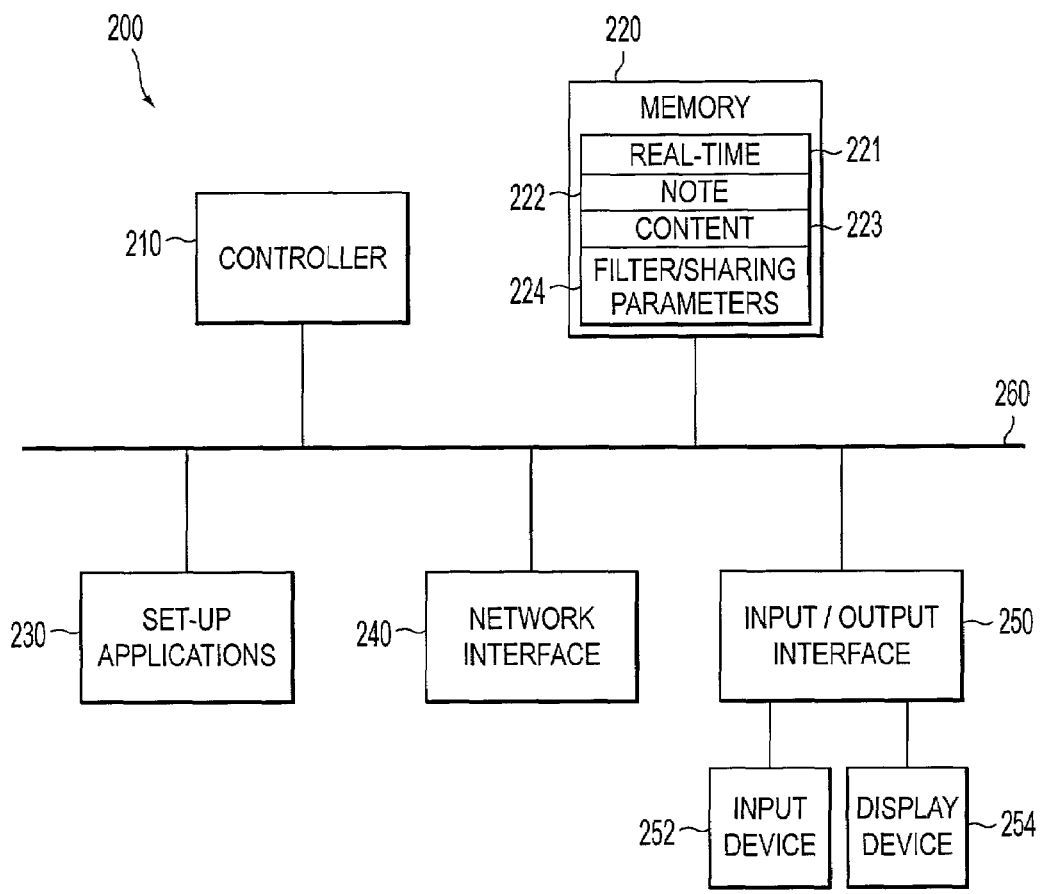
FIG. 2 is a block diagram of one exemplary embodiment of the user device for the collaborative note taking system of FIG. 1.

FIG. 2 is a block diagram of one exemplary embodiment of a user device 200 according to this invention. As shown in FIG. 2, the user device 200 includes one or more of a controller 210, a memory 220, a set-up circuit, routine, or application 230, a network interface 240, and an input/output interface 250 connected together by one or more common buses and/or application programming interfaces 260. One or more input device 252 and one or more display devices 254 can be connected to the input/output interface 250.

As shown in FIG. 2, in various exemplary embodiments, the memory 220 can include, but is not limited to, a real-time portion 221, a note portion 222, a content portion 223, and filter/sharing parameters portion 224. It should be appreciated that these are functional and not physical portions of the memory 220. In various exemplary embodiments, the real-time portion 221 can store text annotated by the user during a note-taking session using any entry technique compatible with the user device 200. This includes, but is not limited to, keyboards, stylus, and voice-to-text capabilities.

In various exemplary embodiments, the note portion 222 can store text input by the user using the user device 200 and/or text displayed on the user device 200 that has been received, via the collaborative note (or data) management system 400, from other users, including the real-time notes and/or other informational sources, such as past presentations, publications, and the like. In various exemplary embodiments, the content portion 223 can store related material to be used for the collaborative session. In various exemplary embodiments, the filter/sharing parameters portion 224 can store the user's options established for filtering the user's notes with the collaborative note-taking session. These filter and/or sharing parameters may include the level of note sharing, with whom the notes will be shared, and the like, and may be established and stored during initial set-up.

The memory 220 can be implemented using any appropriate combination of alterable, volatile or non-volatile memory or non-alterable, or fixed, memory. The alterable memory, whether volatile or non-volatile, can be implemented using any one or more of static or dynamic gram, a floppy disk or disk drive, a writable or rewritable optical disk and disk drive, a hard drive, flash memory or the like. Likewise, the non-alterable or fixed memory can be implemented using any one or more of ROM, PROM, EPROM, EEPROM, and optical disk, ROM disk, such as CD ROM or DVD ROM, and disk drive or the like.

The set-up circuit, routine or application 230 can be implemented using any combination of hardware circuitry and/or software routines, objects and/or programs that enable the user to configure the user device 200 to participate in a collaborative note-taking session. In various embodiments, this can include establishing the proper communication link via the network 300 to the collaborative note (or data) management system 400. Further the set-up circuit, routine or application 230 can establish the filtering parameters stored in filter/sharing parameters portion 224 of the memory 220.

In operation, the user device 200 is used to input the setup information for a particular collaborative note-taking session by interacting with the setup circuit, routine or application 230, to input notes as desired by the user of the user device 200 and to provide those notes, or filtered versions of those notes, to the collaborative note (or data) management system 400. The user device 200 is further used to receive raw or filtered notes from the collaborative note (or data) management system 400, to display text (or data) portions at least corresponding to the received raw or filtered notes, to select one or more of the displayed text (or data) portions, and to display the selected one or more displayed text (or data) portions as text (or data) portions input by the user of that user device 200. In various exemplary embodiments, the text (or data) portions are selected by, for example, using a single mouse click when using a mouse as an input device, or by, for example, using a single tap when using a touch pad and stylus as in input device, such as with a PalmPilot® or other PDA.

Figure 4:
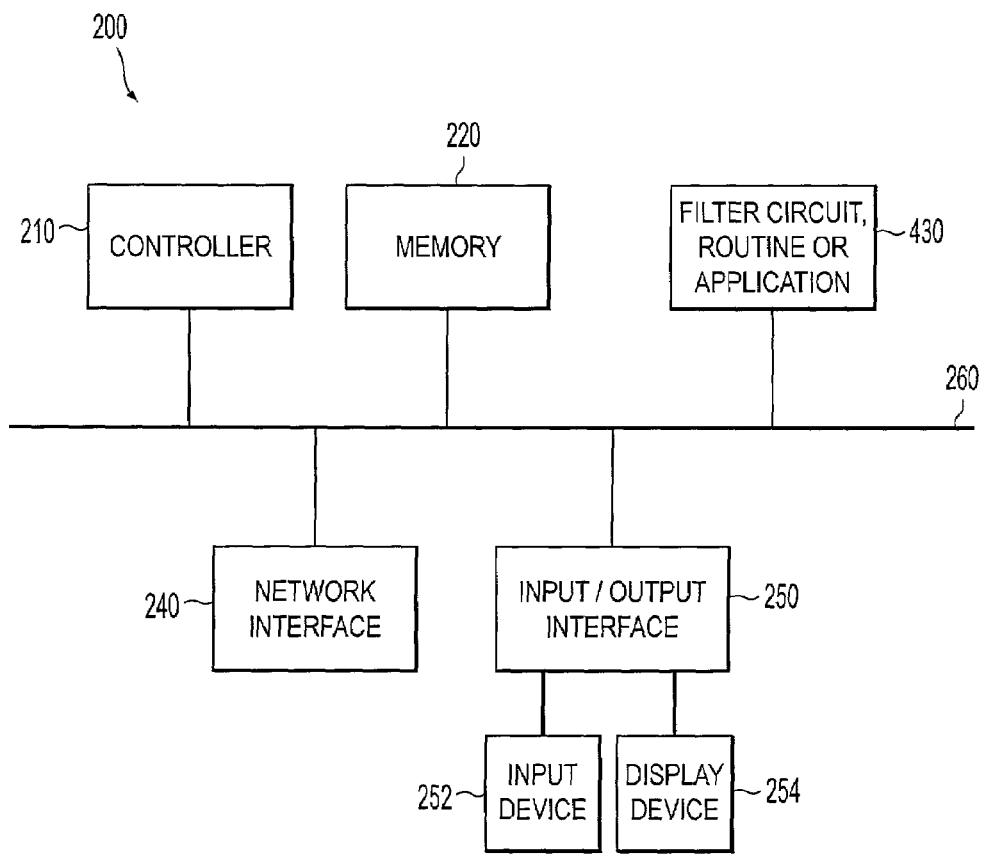
FIG. 4 is a second exemplary embodiment of the user device for the collaborative note taking system of FIG. 1.

As described in further detail below, if raw notes (or data) are received from the collaborative note (or data) management system 400, a filter circuit, routine or application 430, as shown in FIG. 4, will filter the various notes received from the various users based on the filtering parameters of the user who created that note. Likewise, in various exemplary embodiments, where filtering of the notes being forwarded from this user to the collaborative note (or data) management system 400 takes place locally, the filtering parameters entered by this user are used by the filter circuit, routine or application 430 to filter the notes before the filtered notes are forwarded to the collaborative note (or data) management system 400.

Figure 5:
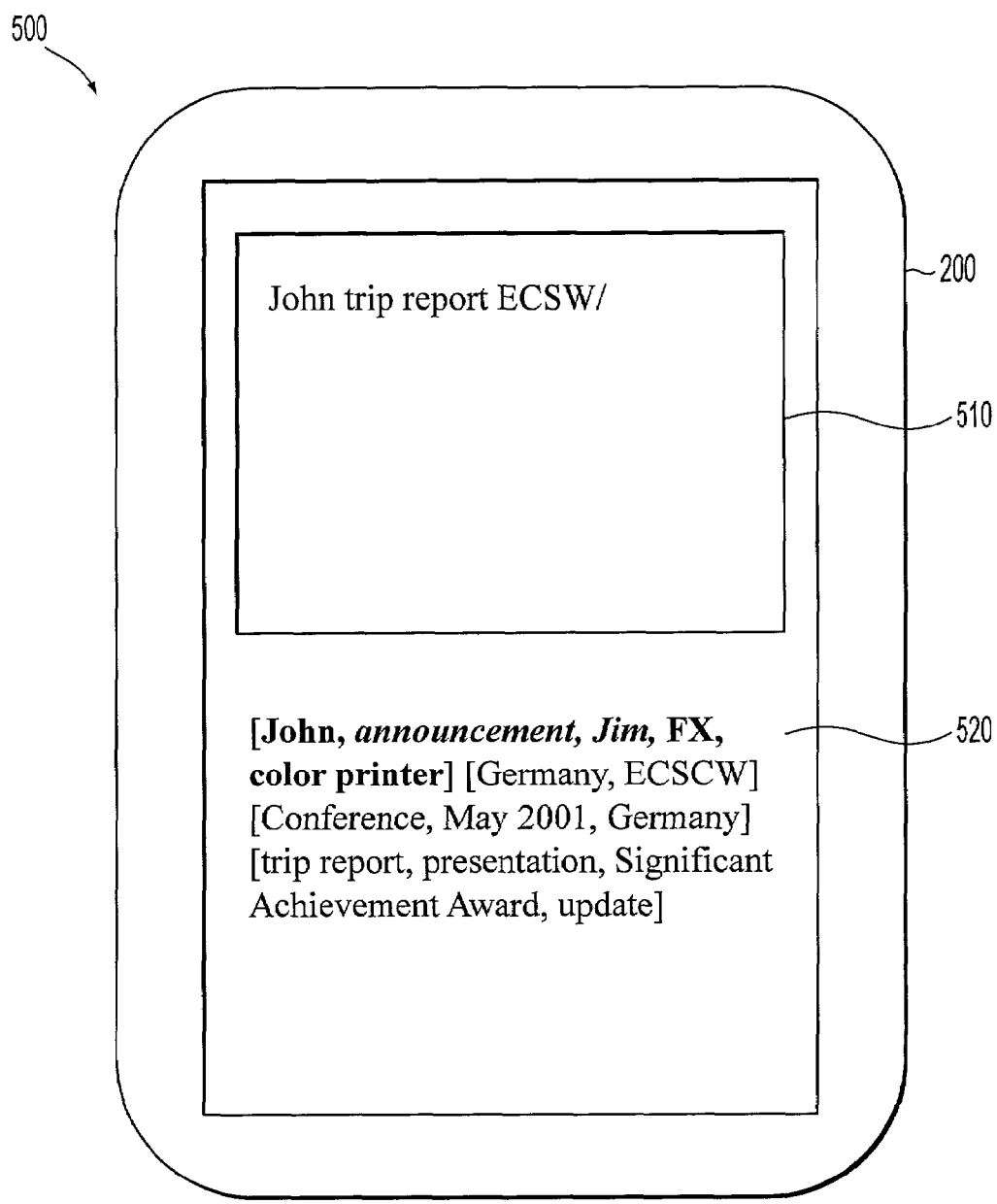
FIG. 5 is one exemplary embodiment of a screen shot of a user device using the collaborative note taking system according to this invention.
Figure 6:
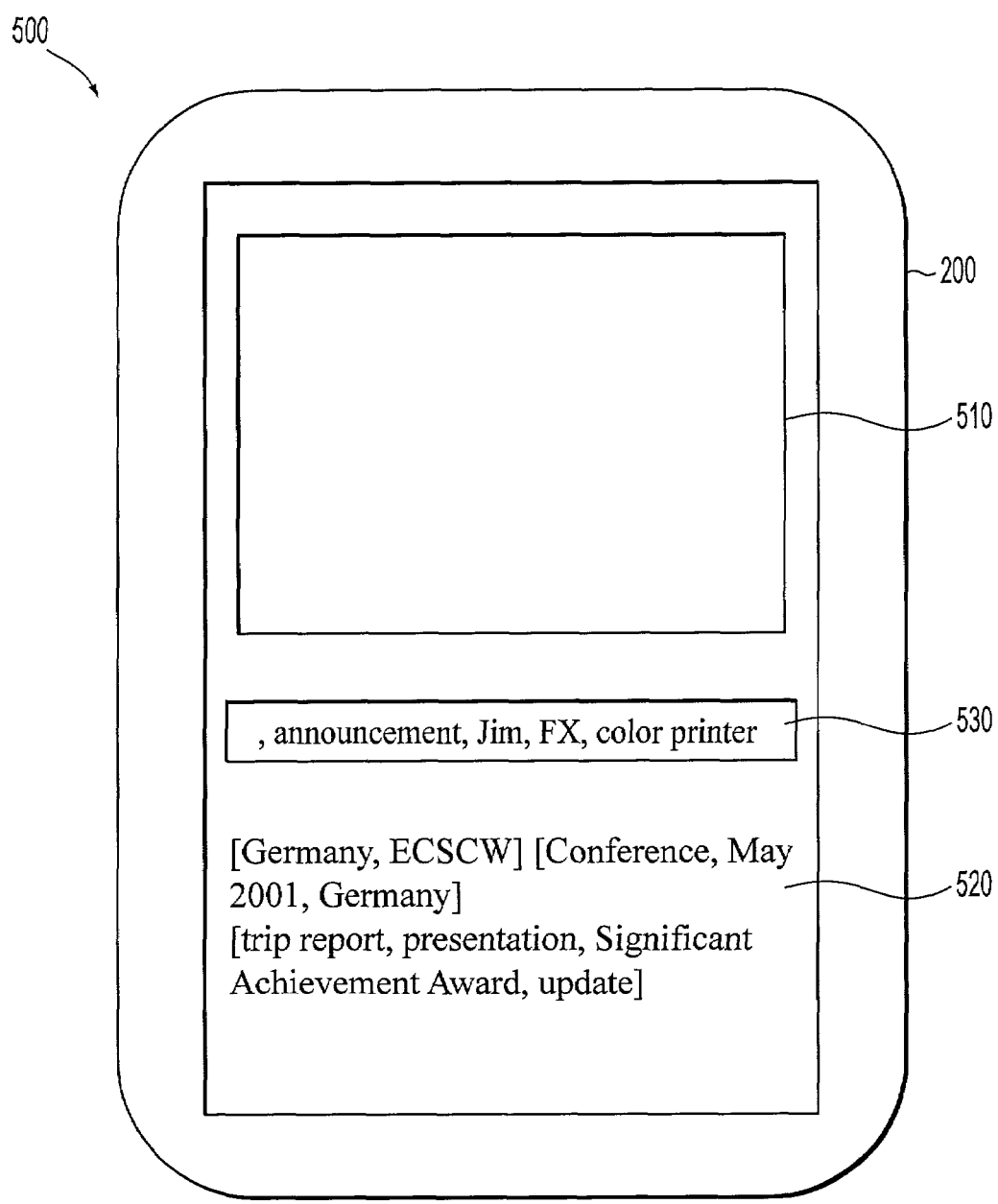
FIG. 6 is second exemplary embodiment of a screen shot of a user device using the collaborative note taking system according to this invention.
Figure 7:
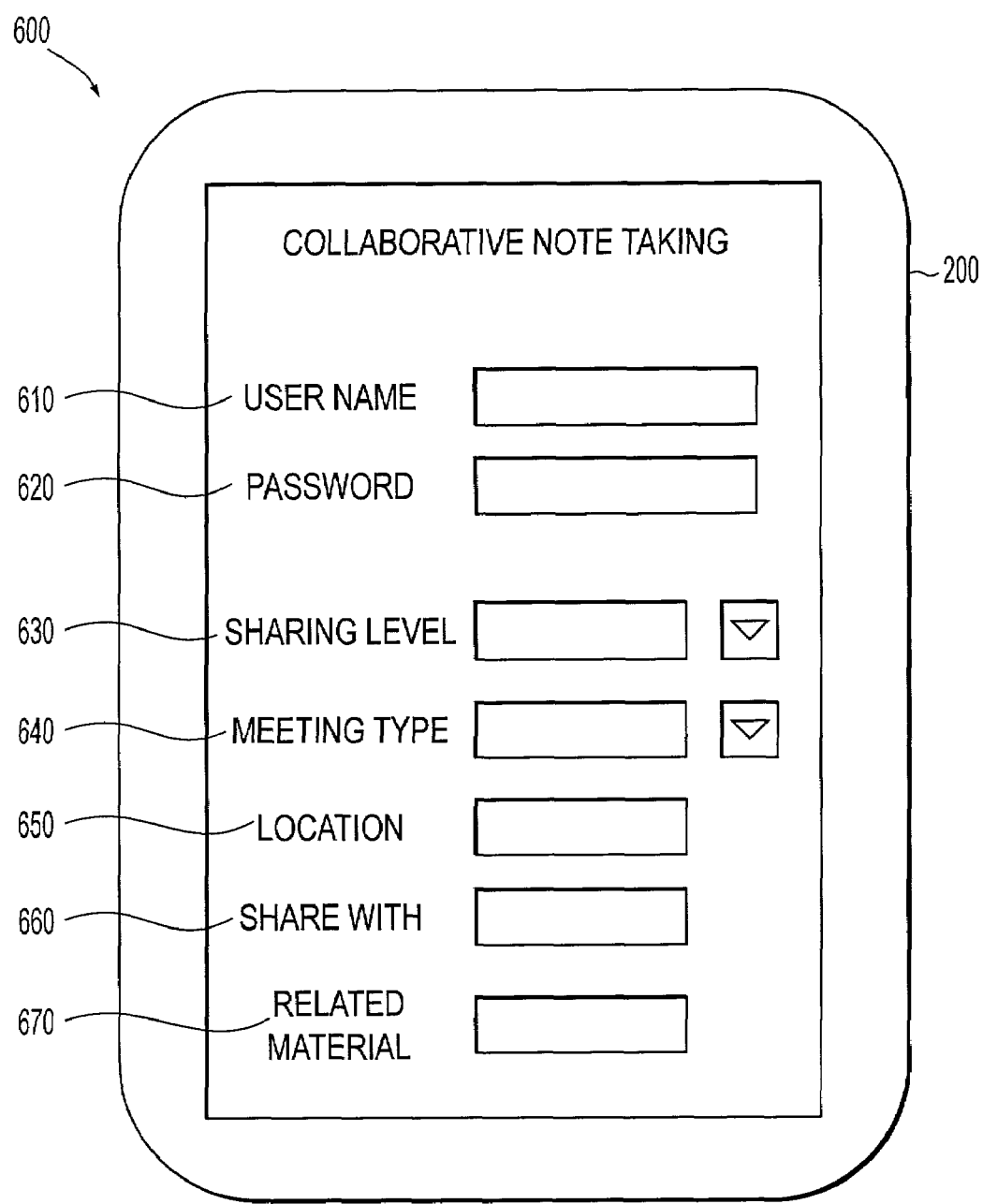
FIG. 7 is an exemplary embodiment of a log-in screen shot of a user device accessing the collaborative note taking system according to this invention.

In operation, the various graphical user interface screens, as outlined below with respect to FIGS. 5-7 are controllably displayed to the user by the controller 210 to variously allow the user to interact with the setup circuit routine or application 230, to input notes, and to retrieve at least filtered words or portions of notes entered by other users for use as this user's own notes.

It should be appreciated that the user device 200 can be implemented as a portion of a programmed general-purpose computer. Alternatively, the user device 200 can be implemented using an ASIC, a FPGA, a PLD, a PLA, or a PAL, or using physically distinct hardware circuits, such as discrete logic elements or discrete circuit elements. The particular form the user device 200 will take is a design choice and will be obvious to those skilled in the art. Alternatively, the user device 200 can be implemented as a portion of a software program usable to form the overall control system of a computing device. In this case, each of the controller 210 and the set-up routine 230 can be implemented as software routines, objects and/or application programming interfaces or the like. In general, the user device 200 can be implemented using a personal computer, a laptop or other portable computer, a personal digital assistant, a hand-held computer, a cell phone, a text-capable pager, or the like.

In general, the one or more input devices 252 can include any one or more of a keyboard, a keypad, a mouse, a track ball, a track pad, a touch screen with or without an associated stylus, a microphone and associated voice recognition system software, a joy stick, a pen-base system, or any other known or later-developed system for providing control and/or data signals to the user device 200. The input device 252 can further include any manual or automated device usable by a user or other system to present data or other stimuli to the user device 200. For example, the input device 252 can be any known or later developed technology suitable for note taking, such as a remote laptop computer, pen-based notebook computer, or personal digital assistant.

Figure 3:
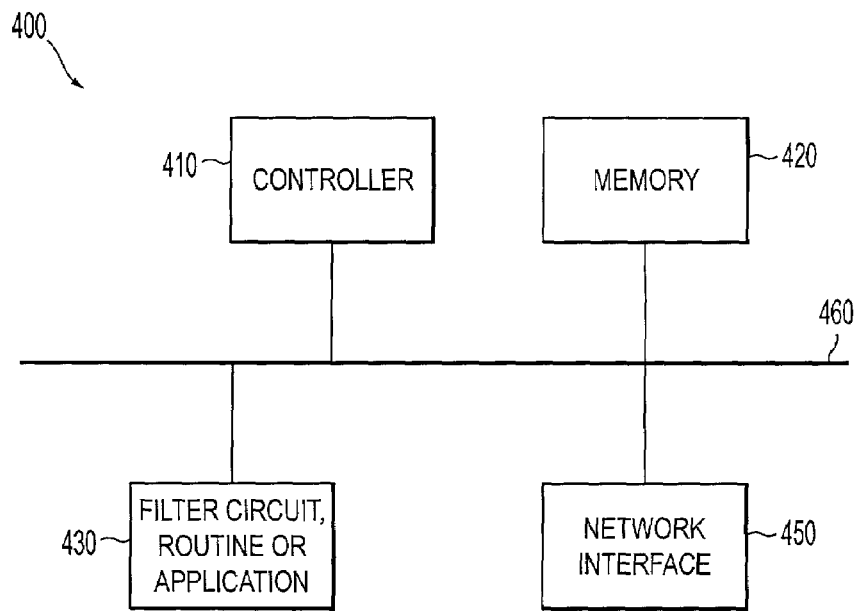
FIG. 3 is a block diagram of one exemplary embodiment of the note taking system device for the collaborative note taking system of FIG. 1.

FIG. 3 is a block diagram of one exemplary embodiment of the collaborative (or data) note management system 400. As shown in FIG. 3, the collaborative note (or data) management system 400 includes one or more of a controller 410, a memory 420, a filter circuit, routine or application 430 and a network interface 450 connected together by one or more common buses and/or application programming interfaces 460.

The memory 420 can be implemented using any appropriate combination of alterable, volatile or non-volatile memory or non-alterable, or fixed, memory. The alterable memory, whether volatile or non-volatile, can be implemented using any one or more of static or dynamic gram, a floppy disk or disk drive, a writable or rewritable optical disk and disk drive, a hard drive, flash memory or the like. Likewise, the non-alterable or fixed memory can be implemented using any one or more of ROM, PROM, EPROM, EEPROM, and optical disk, ROM disk, such as CD ROM or DVD ROM, and disk drive or the like.

It should be appreciated that the collaborative note (or data) management system 400 can be implemented using any device that is connectable to a data communication network. The collaborative note (or data) management system 400 may be implemented using a programmed general purpose computer, a special purpose computer, a programmed microprocessor, a digital signal processor (DSP), an ASIC or other integrated circuit device or programmable logic device such as a PLD, PLA, FPGA or PAL, or the like. In general, any hardware and/or software system capable of implementing and processing data and information from a data network may be used to implement the collaborative note (or data) management system 400.

It should be understood that the filter circuit, routine or application 430 can be implemented as portions of a suitably programmed general-purpose computer. Alternatively, the filter circuit, routine or application 430 can be implemented as physically distinct hardware circuits within an ASIC, using a digital signal processor (DSP) or using a FPGA, a PLD, a PLA and/or a PAL, or using discrete logic elements or discrete circuit elements. The particular form the filter circuit, routine or application 430 will take is a design choice and will be obvious and predicable to those skilled in the art.

In operation, the filter circuit, routine or application 430 can identify and remove unnecessary information in a note received from a user device 200 over the network 300 that is not relevant to the collaborative meeting session. The filter circuit, routine or application 430 enables, through using one or more filtering techniques and/or algorithms, information to be shared among the users of the collaborative note taking (or data sharing) system 100. Further, the filter circuit, routine or application 430 identifies what words and/or phrases are attracting attention from the users.

In various exemplary embodiments of the systems and methods, the filter circuit, routine or application 430 may receive the information and notes entered on the user devices 200 of the various users in real-time and determine "live" words, i.e., those words that are currently being used, to be shared with the participating users. The filter circuit, routine or application 430 can identify and rank words based upon their frequency of use by the users of the collaborative note taking (or data sharing) system 100 using, for example, probabilistic statistical models. As a result, the filter circuit, routine or application 430 can provide recommended relevant text, documents, and other sources of information to a particular user or users of the collaborative note taking (or data sharing) system 100. This information is transmitted via the network 300 to the user devices 200 and displayed on the user devices 200 for insertion into the user's own annotated notes.

It should be appreciated that techniques for ranking and selecting words, such as, frequency of use, users preferences, personalized recommendations, and the like, can be used. Further, techniques for generating the list of recommended text, documentation and other sources of information can include, but are not limited, to information retrieval algorithms. It should be further appreciated that the technique for filtering can vary and the design choice will be apparent to those skilled in the art.

Although depicted in FIG. 3 as an element of the collaborative note (or data) management system 400, it should be appreciated that the filter circuit, routine or application 430 can alternatively be integrated into the user device 200, as illustrated in FIG. 4. FIG. 4 depicts a second exemplary embodiment of the user device 200 for the collaborative note taking (or data sharing) system 100 where the filter circuit, routine or application 430 is incorporated into the user device 200 instead of, or in addition to, the filter circuit, routine or application 430 of the collaborative note (or data) management system 400. The filter circuit, routine or application 430 performs the same function as discussed above with respect to the collaborative note (or data) management system 400.

In operation, the user inputs text into the user device 200 during a collaborative note-taking session using any of one or more input methods compatible with the user device 200. The text is initially filtered using the set-up parameters, established by the user for sharing information with the collaborative note taking (or data sharing) system 100 and stored in the files/sharing parameters portion 224, including how much of the text to send, with whom to share the text, other relevant documentation to share, and the like. The text is then transmitted, via the network interface 240 and across the network 300, to the collaborative note (or data) management system 400, where text and information from other users is collected. The text and information collected is then filtered using the filter circuit, routine or application 430 to determine a set of "live" words that represent the prevailing words and/or phrases currently being used by the users in their notes and key words from other information sources provided by the users. The text and information of various users that may have been ranked and that represent the "live" words and key words are transmitted via the network interface 440 back to the user devices 200. It should be appreciated that certain user's words may not be shared with the entire note-taking group based upon the pre-set options of the users that limit the level of sharing and with whom.

"Live" words and other key source words are received by the user devices 200 and displayed on the display device 254. The users may opt to select one or more of the displayed words using any selection technique that is compatible with the user device 200 such as, for example, a single-tap on a PDA, such as a "Palm Pilot". The selected words are then inserted into the user's notes.

As indicated above, in various exemplary embodiments, the filter circuit, routine or application 430 can be used to locally filter notes entered by the user of this user device 200 before the filtered notes are forwarded to the collaborative note (or data) management system 400. In this case, the filter circuit, routine or application 430 applies the filter and/or sharing parameters stored in the filter/sharing parameters portion 224 to filter this user's notes before the filtered results are forwarded to the collaborative note (or data) management system 400 for distribution to the other users during this collaborative note-taking session. In various other exemplary embodiments, the filter circuit, routine or application 430 is used to locally filter raw notes received from the other users via the collaborative note (or data) management system 400. In this case, the filter circuit, routine or application 430 applies the particular filtering and/or sharing parameters of the particular user associated with each particular note before that filtered note is made accessible to the user of this user device 200. Of course, in various exemplary embodiments, the filter circuit, routine or application 430 can provide both of these features.

Alternatively, in various other exemplary embodiments, the collaborative note (or data) management system 400 can provide one or both of these features. That is, in various exemplary embodiments, for each note received from a particular user, a filter circuit, routine or application 430 within the collaborative note (or data) management system 400 applies the filter and/or sharing parameters associated with that user to filter that note before that filtered note is made available to the other users. In this case, each user's filter and/or sharing parameters are forwarded from that user's user device 200 to the collaborative note (or data) management system 400.

FIG. 5 illustrates one exemplary embodiment of a screen 500 displayable on the display device 254 of a user device 200 that is part of the collaborative note taking (or data sharing) system 100. As shown in FIG. 5, the screen 500 includes a text box 510 and a word list 520.

The text box 510 can be used by the user to enter notes using, for example, a soft keyboard, a stylus or other devices and/or techniques for entering text. The word list 520 below the text box 510 represent words that have been entered, input or selected by one or more of the other users or extracted from other source material provided by any of the one or more of the users participating in the collaborative note-taking session. These words may be distinguished visually for different word categories. In FIG. 5, the different categories of words in the word list 520 are separated by brackets. Furthermore, font style and/or color can be used to further categorize the words into distinct classes or categories. For example, "live" words that are currently being used by one or more of the users may be displayed with a bold font. These "live" words can be continually updated as users add notes or the like to the collaborative note taking (or data sharing) system 100. For example, words used by other users can be displayed in a bold and italic font, while words that have been used by the user of the user device 200 can be displayed in a bold font. The other words and phrases can be from other sources, such as for example, a trip report.

FIG. 6 illustrates a second exemplary embodiment of the screen 500. As in FIG. 5, the screen 500 includes the text box 510 and the word list 520. As shown in FIG. 6, the screen 500 also includes a ticker-tape window 530.

According to various embodiments, the ticker tape window 530 can be used to display various categories of words. In FIG. 6, the shared "live" and other words extracted in real-time, as well as words and/or phrases used by other users can be displayed using the ticker-tape window 530.

In both FIGS. 5 and 6, selecting a word from the word list 520, for example, with a stylus, will append it and/or the original context of the word to the current notes in the text box 510. It should be appreciated that the level of information in the original context of the word can be filtered by the set-up options of the user from whom the word came. In various embodiments, words in the word list 520 can be displayed with icons next to each word identifying the originator of the word.

FIG. 7 is one exemplary embodiment of a log-in screen 600 displayable on the display device 254 and usable by a user to access the collaborative note taking (or data sharing) system 100. As shown in FIG. 7, the log-in screen 600 includes a user name input box 610, a password input box 620, a sharing level list box 630, a meeting type selection 640, a location list box 650, a share with user list box 660, and related material selection 670.

Logging into the note-taking session using the log-in screen 600 allows users to set-up different options. It should be appreciated that the software that initiates this process can be integrated with the user device 200 or the collaborative note (or data) management system 400, depending on the preference of the users and/or capability of the collaborative note taking (or data sharing) system 100 and/or user device 200.

When operating the log-in process, a user inputs a user name into the user name input box 610 and/or a password into the password input box 620. The user also selects a sharing level from one of the possible sharing levels provided for the sharing level list box 630. The selected sharing level defines how much of the notes generated by the user will be sharable with the other users. For example, the user can share every word input, the individual words used and entered but not the original notes as entered, or the like. Information indicating the type of meeting to be logged into, for example, a staff meeting, is input by the user by selecting an entry from the meeting type selection list box 640. The user inputs a meeting location using the meeting location input box 650. It should be appreciated that information like the type of meeting and location can be automatically entered if other users have already entered this information.

Figure 8:
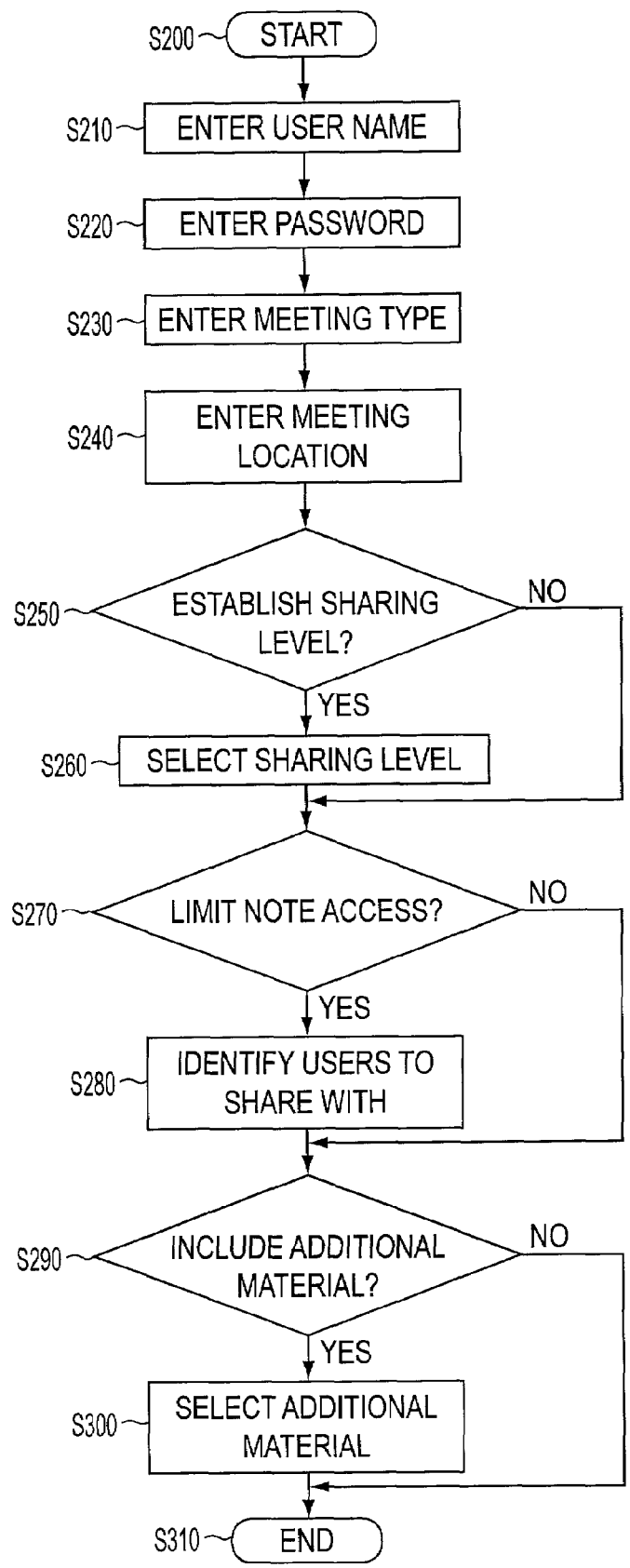
FIG. 8 is a flowchart outlining an exemplary embodiment of a method for initiating a user device for the collaborative note taking system.

FIG. 8 is a flowchart outlining one exemplary embodiment of a method for setting up a collaborative note taking session according to this invention. Beginning in step S200, operation continues to step S210, where the user logs into the collaborative note taking application by entering a user name. Then in step S220, the user enters a password. Next, in step S230, the meeting type is entered. Then, in step S240, the meeting location is entered. It should be appreciated that the user device 200 may automatically enter the information in steps S210 and S220. Likewise, the collaborative note taking (or data sharing) system 100 may automatically provide the information in steps S230 and S240, or the user may input this information. Operation then continues to step S250.

In step S250, a determination is made whether to establish a level of sharing with the other users. For example, the user may wish to share all or none of annotated notes with the rest of the collaborative users. If a sharing level is to be established, operation continues to step S260. Otherwise, operation jumps to step S270. In step S260, the user establishes the sharing level. Then in step S270, a determination is made whether to limit access by specific users to a specified level of notes. If specific users are to be selected, operation continues to step S280. Otherwise, operation jumps to step S290. In step S280, other collaborative users are identified to receive the user's specified level of notes. Operation then continues to step S290. In step S290, a determination is made to include additional material for use during the collaborative session. If additional material is to be included, operation continues to step S300. Otherwise, operation jumps to step S310. In step S300, additional material is selected. Operation then continues to step S310, where the operation of the method ends.

Figure 9:
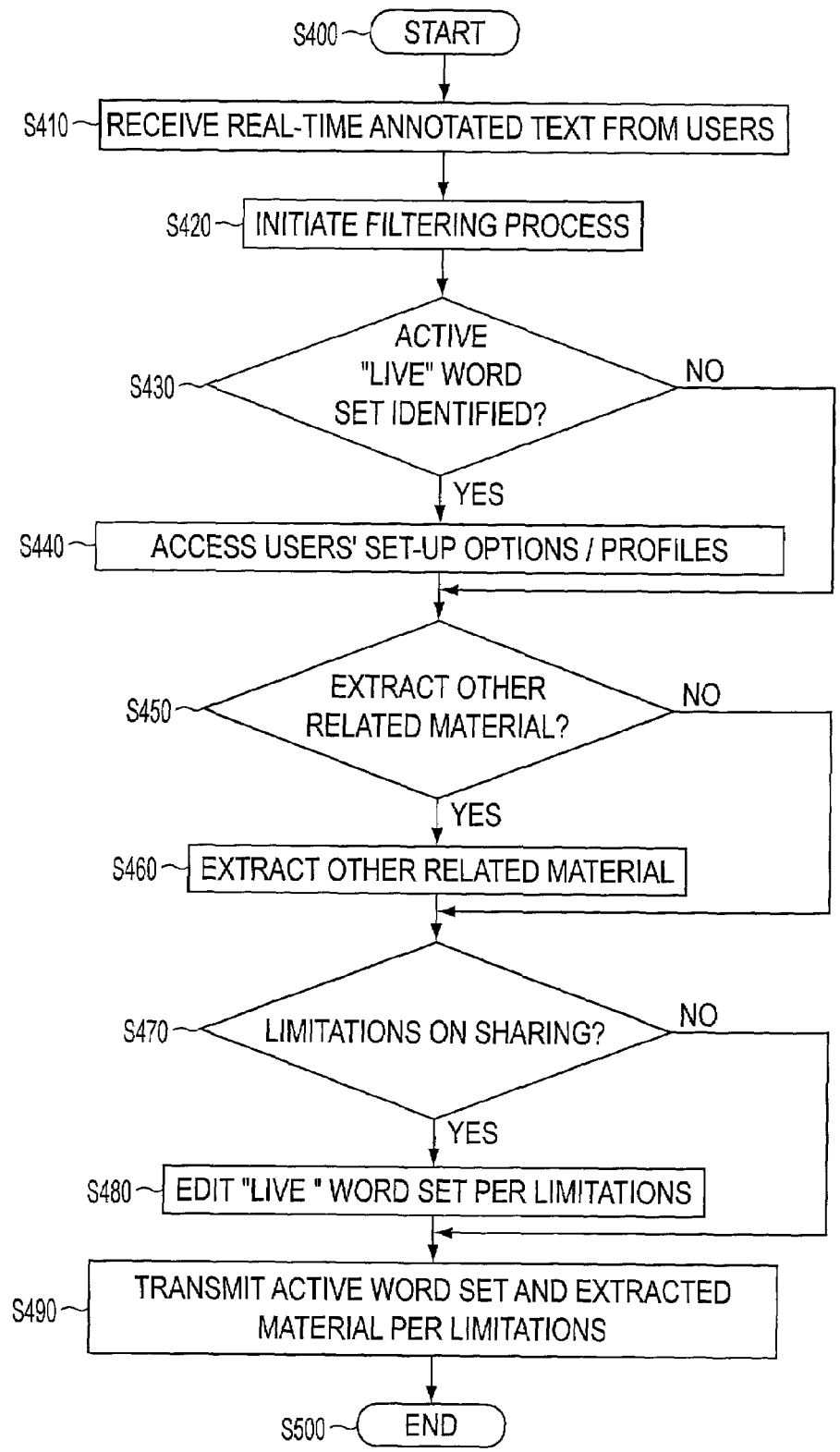
FIG. 9 is a flowchart outlining an exemplary embodiment of the method for filtering during a collaborative note taking session.

FIG. 9 is a flow chart outlining one exemplary embodiment of a method for collaboratively managing note taking during a collaborative session. Beginning in step S400, operation continues to step S410, where text input by the users is received in real time. Then, in step S420, the text is filtered to identify the key active "live" words, which can be ranked based on frequency of use, for example. Next, in step S430, a determination is made whether a list of "live" active words has been identified from the set of real-time annotated text. If a set of "live" words is identified, operation continues to step S440. Otherwise, operation jumps to step S440.

In step S440, the users' set-up options and profiles that the users established when logging into the collaborative session are accessed. Next, in step S450, a determination is made whether to extract other related material for each user based on that user's options or profiles. If related material is to be extracted and included with the word set list, operation continues to step S460. Otherwise, operation jumps to step S470.

In step S460, the related material is extracted based on the user's setup options and profiles. Next, in step S470, a determination is made whether to limit the sharing of the active "live" word set and the extracted related material with and among the other users, based on each user's set-up profile and options accessed in step S440. If a limitation on sharing is identified, operation goes to step S480. Otherwise, operation jumps to step S490.

In step S480, the word set is edited based on the limitations and restrictions in the corresponding user's set-up options and profile. Next, in step S490, the word sets, whether edited or not, as well as any extracted material, are transmitted to the participating users based on the sharing restrictions. Operation then continues to step S500, where the operation of the method ends.

While this invention has been described in conjunction with various exemplary embodiments, it is to be understood that many alternatives, modifications and variations would be apparent to those skilled in the art. Accordingly, Applicants' intent to appraise all such alternatives, modifications, and variations that follow in the spirit and scope of this invention, in particular, while the exemplary embodiments described above involved a system and method for advancing the state of a workflow process, it is to be understood that the system and methods of this invention may be used with any collaborative workflow system.

What is claimed is:

1. A system for collaborative data sharing, the system comprising:
   a plurality of user devices, the user devices being handheld, each of the user devices including:
   one input interface that allows a user to input data to the user device;
   a display device that displays the data; and a filter that generates filtered data by applying predetermined filter parameters to filter the data entered by the user during the collaborative data sharing in real time; and
   a collaborative note management system for identifying live words in the filtered data received from the user devices and for ranking the live words based on a frequency of use using a statistical model, the live words being key active words input into the user devices by the users during a note taking session;
   wherein the collaborative data sharing is conducted in real time during a collaborative data sharing event the collaborative data sharing event being the note taking session;
   wherein the data-sharing event is managed by the collaborative note management system providing supervisory functions, and
   wherein the supervisory functions of the collaborative note management system include controlling interactions which is based on a sharing level and shared with options selected by the user of the handheld device.

2. The system of claim 1, wherein each of the plurality of user devices further comprises a memory, wherein the user enters data regarding user-created filter parameters, the user-created filter parameters are stored in the memory and the filter, applies the stored user-created filter parameters instead of the predetermined filter parameters to generate the filtered data.

3. The system of claim 2, wherein the user-created filter parameters include at least one of a sharing level for the user's input data or an indication of which other users are allowed access to the user's data.

4. The system of claim 1, wherein each of the plurality of user devices further comprises a memory, wherein the user enters data regarding data parameters, the data parameters are stored in the memory and the user device accesses the data parameters to identify additional data to be provided to each user by the system.

5. The system of claim 4, wherein the data parameters comprise at least one of a location of a collaborative data-sharing event, a type of collaborative data-sharing event, or material related to the collaborative data-sharing event.

6. The system of claim 1, wherein the data display portion comprises a plurality of selectable data portions, each selectable data portion corresponding to a data portion received from the collaborative data management system.

7. The system of claim 6, wherein, in response to one of the selectable data portions displayed in the data display portion being selected, at least the data portion corresponding to that selected data portion is displayed in the data entry portion as data input by the user.

8. The system of claim 1, wherein each of the plurality of hand-held devices further comprises an interface that connects the user device to the collaborative data management system to join the collaborative session, wherein at least the portion of the data input by the user during the collaborative session is provided from the collaborative data management system.

9. A method for collaboratively sharing data generated by a plurality of participants in a collaborative data-sharing event, the collaborative data-sharing event utilizing user devices being hand-held devices used by the participants and a collaborative note management system communicating with the user devices, the method at the collaborative note management system comprising:
in real-time receiving data entered during the collaborative data-sharing event by each of the plurality of participants to their respective user devices;
automatically filtering the data entered by at least one of the plurality of participants as the data is being received at the collaborative note management system based on pre-determined filtering parameters applicable to the at least one of the plurality of participants to generate filtered data for that participant to be shared with each of the other ones of the plurality of participants;
identifying live words in the data in real-time, the live words being key active words of the data input into the user devices by the users during a note taking session;
ranking the live words based on a frequency of use and by using a statistical model; and
providing the live words to the user devices of the participants during the note taking session,
wherein the data-sharing event is managed by the collaborative note management system providing supervisory functions, and
wherein the supervisory functions of the collaborative note management system include controlling interactions which is based on a sharing level and shared with options selected by the user of the handheld device.

10. The method of claim 9, wherein the received data includes user-created filtering parameters from each of the plurality of participants, the user-created filtering parameters received from each of the plurality of participants being stored in a memory in a central location, and the filtering the data entered by one of the plurality of participants in the collaborative data-sharing event is based on the user-created filtering parameters replacing the predetermined filtering parameters for that one of the plurality of participants.

11. The method of claim 10, wherein providing the filtered data for one participant to each of the other ones of the plurality of participants in the collaborative data-sharing event comprises providing the filtered data for one participant to each of the other ones of the plurality of participants in the collaborative data-sharing event from the central location.

12. The method of claim 9 wherein the received data has been pre-filtered based on each participant inputting user-created filtering parameters for that participant at the user device of that participant, user-created filtering parameters for each participant are stored in a memory of the user device of that participant, and filtering the data entered by one of the plurality of participants in the collaborative data-sharing event based on the user-created filtering parameters for that one of the plurality of participants comprises filtering, for each participant, the data entered by that participant in the collaborative data-sharing event based on the user-created filtering parameters for that participant to generated filtered data for that participant at the user device of that participant.

13. The method of claim 12, further comprising, for each participant forwarding the filtered data for that participant to a central location, wherein providing the filtered data for one participant to each of the other ones of the plurality of participants in the collaborative data-sharing event comprises providing the filtered data for one participant to each of the other ones of the plurality of participants in the collaborative data-sharing event from the central location.

14. The method of claim 9, wherein the received data from at least one of the plurality of participants comprises second data that identifies additional data to be provided to each participant.

15. The method of claim 14, wherein the second data comprises at least one of a location of a collaborative data-sharing event, a type of collaborative data-sharing event, and material related to the collaborative data-sharing event.

16. The method of claim 9, wherein at least a portion of data received from each user comprises notes made during a collaborative note-taking event.

17. The method of claim 16, wherein, for each participant, the filtering parameters for that participant include at least one of a sharing level for that participant or an indication of access for other participants to that participant's notes.

18. The method of claim 9, wherein, for each participant, the filtering parameters for that participant include at least one of a sharing level for that participant or an indication of which other participants are allowed access to that participant's data.

19. A system for data-sharing between participants in a collaborative data-sharing event, the system comprising:
a plurality of hand-held devices being used by the participants; a distributed network for providing communication between the hand-held devices; and
a collaborative note management system in communication with the distributed network between the participants, the collaborative note management system: ranking live words being shared between the participants in the collaborative data-sharing event based on a frequency of use by the participants in real-time and by using a statistical model, the live word being key active words, the collaborative note management system filtering the live words entered in each of the hand-held devices; and providing the live words to others of the hand-held devices in real-time during the collaborative data-sharing event, wherein the data-sharing event is managed by the collaborative note management system providing supervisory functions, and wherein the supervisory functions of the collaborative note management system include controlling interactions which is based on a sharing level and shared with options selected by the user of the handheld device.

20. The system of claim 19, wherein the collaborative note management system further ranks the words, the notes and the documents based on personal profiles of the participants.

21. The system of claim 19, wherein the hand-held devices are implemented as one of a cell phone and a personal digital assistant.

22. The system of claim 19, wherein the distributed network is implemented as one of a public switched telephone network, a local area network, a wide area network, a storage area network, an intranet, an extranet, and the internet.

23. The system of claim 19, wherein the hand-held devices further extract data from a plurality of previously created information sources.

24. A method for collaborative data-sharing of data generated by a plurality of hand-held devices during a data-sharing event, the data-sharing event being managed by a collaborative note management system providing supervisory functions, the method at the hand-held devices comprising:

initiating a note-taking session at each of the hand-held devices;

receiving input from a participant using one of the hand-held devices indicating a level of sharing between the hand-held device of the participant and others of the hand-held devices being used by other participants;

receiving from the participants a text input to one or more of the hand-held devices;

identifying live words in the texts in real-time, the live words being key active words in the texts;

ranking the live words using a statistical model based on a frequency of use; providing the texts to the collaborative note management system; and receiving the supervisory functions at each of the hand-held devices from the collaborative note management system, wherein the method is conducted during the data-sharing event in real-time between the participants, and wherein the supervisory functions of the collaborative note management system include controlling interactions which is based on a sharing level and shared with options selected by the user of the handheld device.

25. The method of claim 24, further comprising:

preventing the others of the hand-held devices from receiving the live words or a subset of the live words according to the level of sharing between each of the hand-held devices and the others of the hand-held devices; and editing the live words before providing the live words to others of the hand-held devices.

26. The method of claim 24, further comprising:

receiving an indication from the collaborative note management system whether to include additional material including data extracted from previously created information sources in the data-sharing;

selecting the additional material; and providing the additional material to others of the hand-held devices.

27. The method of claim 24, further comprising:

receiving a selection from a participant, a word from the live words; and appending the word or an original context of the word into notes of the participant making the selection;

wherein the original context of the word is set by the participant inputting the word from the live words.

* * * * *